United States Patent [19]

Kobayashi et al.

[11] Patent Number: 4,718,247

[45] Date of Patent: Jan. 12, 1988

[54] REFRIGERATOR TEMPERATURE CONTROL SYSTEM

[75] Inventors: Minoru Kobayashi, Tochigi; Kenichi Iizuka, Ashikaga; Ryoichi Fujimoto, Tochigi; Morio Kobayashi, Oyama, all of Japan

[73] Assignee: Hitachi, Ltd., Tokyo, Japan

[21] Appl. No.: 908,659

[22] Filed: Sep. 17, 1986

[30] Foreign Application Priority Data

Sep. 25, 1985 [JP] Japan ................................ 60-209905

[51] Int. Cl.⁴ .............................................. F25B 1/00
[52] U.S. Cl. .................................... 62/228.4; 62/158; 62/229
[58] Field of Search ................... 62/158, 228.4, 228.5, 62/200, 199, 215, 229

[56] References Cited

U.S. PATENT DOCUMENTS

| 4,419,866 | 12/1983 | Howland | 62/158 |
| 4,480,442 | 11/1984 | Ide et al. | 62/228.4 |
| 4,566,289 | 1/1986 | Iizuka et al. | 62/228.4 |

FOREIGN PATENT DOCUMENTS

0071876 4/1985 Japan .

*Primary Examiner*—Harry Tanner
*Attorney, Agent, or Firm*—Antonelli, Terry & Wands

[57] ABSTRACT

A refrigerator temperature control system is disclosed in which the compressor for compressing a refrigerant is driven selectively at either a normal lower rotation speed or a higher rotational speed and the higher rotational speed is applied only when any of the freezer compartment temperature and the fresh food compartment temperature is not reduced below a predetermined temperature level for at least a predetermined time interval.

3 Claims, 9 Drawing Figures

FIG. 1
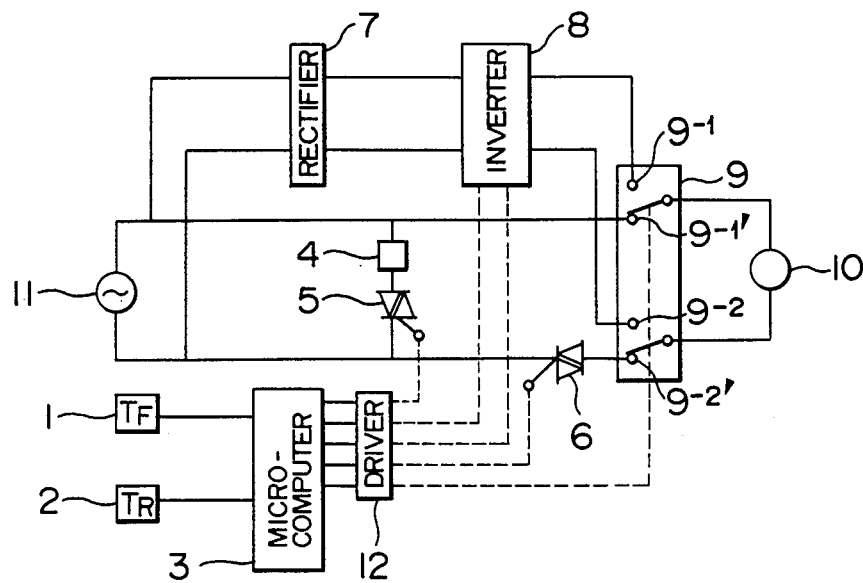
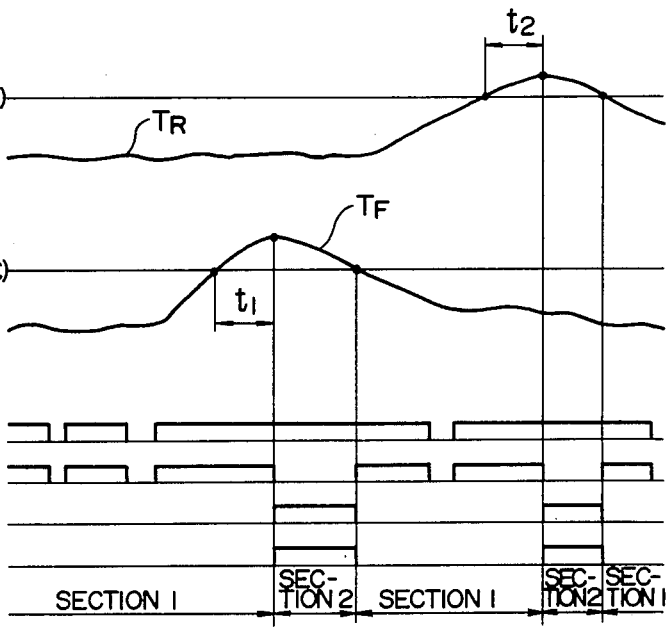
FIG.2A $T_R^\circ$ (+10°C)
TEMPERATURE OF FRESH FOOD COMPARTMENT
FIG.2B $T_F^\circ$ (−10°C)
TEMPERATURE OF FREEZER COMPARTMENT
FIG.2C
FIG.2D
FIG.2E
FIG.2F
FIG.2G

REFRIGERATOR TEMPERATURE CONTROL SYSTEM

BACKGROUND OF THE INVENTION

1. Field of the Invention

The present invention relates to a temperature control system for refrigerator, and particularly to a refrigerator temperature control system in which a compressor for compressing a refrigerant is driven at a speed variable between normal (lower) and higher rotational speed.

2. Description of the Prior Art

Generally, the inner temperature of a refrigerator, e.g. the temperature of its freezer or fresh food compartment, gradually rises due to frequent opening of the door of any compartment and loading therein of foods or the like, and hence the compressor is automatically driven periodically at predetermined time intervals so that the inner temperature of the refrigerator does not exceed a predetermined level. Nevertheless, the temperature of the freezer compartment or the fresh food compartment may rise beyond the predetermined temperature level depending on the frequency of door opening or the temperature or volume of foods newly loaded therein. In the conventional refrigerators, therefore, when the temperature of the freezer compartment or the fresh food compartment rises beyond a predetermined value, the compressor is forcibly driven for nonstop operation until the temperature is reduced below the predetermined temperature level.

Further, in a refrigerator comprising speed control means for changing the rotational speed of the compressor, when the internal temperature of the refrigerator rises higher than a predetermined level, the compressor is immediately driven at high speed so that the internal temperature is rapidly reduced thereby to maintain the temperature below the predetermined level.

A refrigerator of this type is disclosed in Japanese Patent Publication No. JP-A-60-71876.

In these conventional refrigerators, the compressor is driven at a rated or higher speed immediately when the internal temperature of the refrigerator rises beyond a predetermined temperature level.

In the case where the internal temperature thereof temporarily exceeds a predetermined level by opening the door of the refrigerator for a short time interval or by loading a small amount of foods in the refrigerator, however, the internal temperature is restored to the predetermined level within a short length of time by a refrigeration capacity of the contents loaded in the refrigerator.

It is, therefore, not necessary to forcibly operate the compressor continuously or at high speed in such a case. Nevertheless, the conventional control devices effect the continuous or high-speed operation of the compressor, resulting in a problem of an increased power consumption or noises.

SUMMARY OF THE INVENTION

The object of the present invention is to provide a refrigerator which is not driven at a higher speed if the internal temperature of the freezer compartment or the fresh food compartment rises only temporarily, while the compressor is operated at a higher speed only when rapid cooling is required, so that the compressor is prevented from being operated frequently at the higher speed, thus reducing the power consumption and noises.

In order to achieve this object, according to the present invention, there is provided a refrigerator temperature control system in which the compressor is operated at a normal (lower) speed when the internal temperature of the freezer compartment or the fresh food compartment is lower than a predetermined level, and the compressor is operated at a higher speed for rapid cooling when the internal temperature of the freezer compartment or the fresh food compartment rises beyond the predetermined temperature level continuously for a predetermined length of time.

BRIEF DESCRIPTION OF THE DRAWINGS

FIG. 1 is a block diagram showing a configuration of an embodiment of the present invention.

FIGS. 2A to 2G are time charts for explaining the operation of the block diagram of FIG. 1.

DESCRIPTION OF THE PREFERRED EMBODIMENTS

Figure 3:
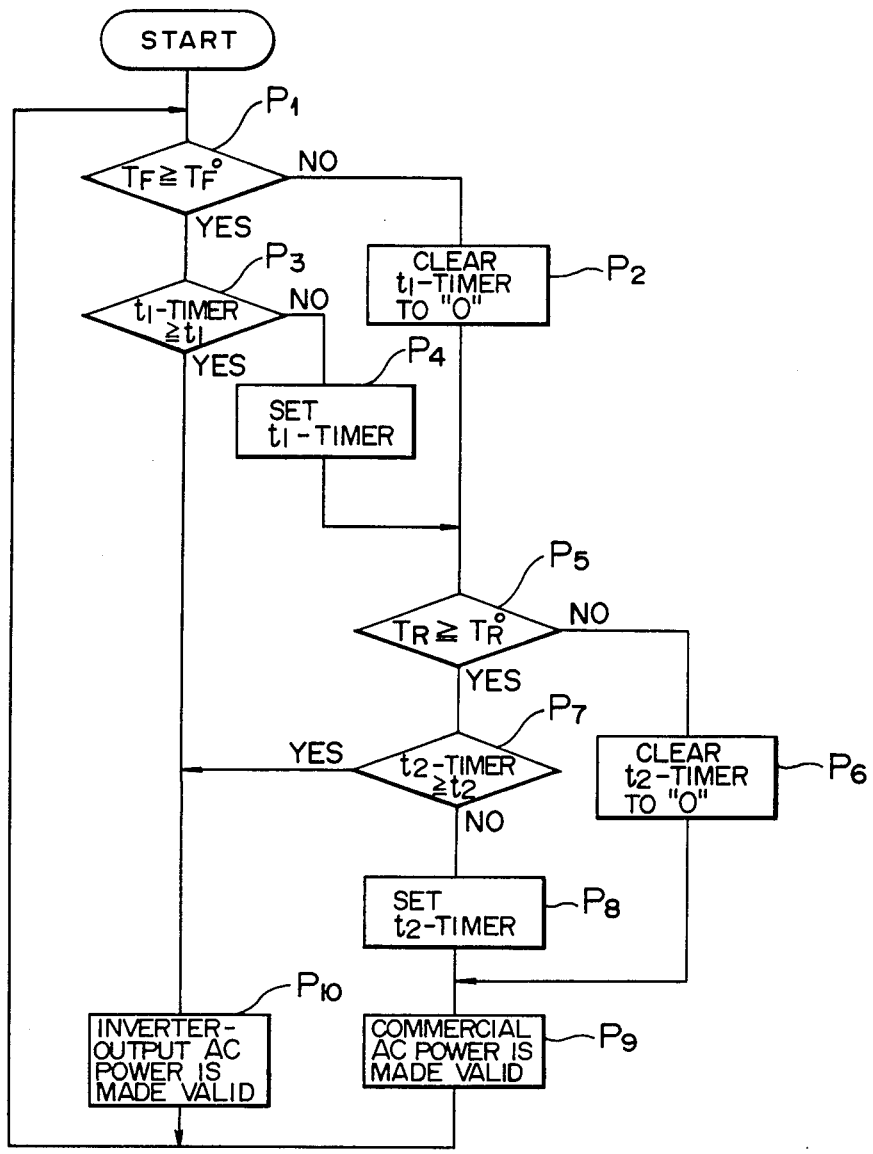
FIG. 3 is a flowchart showing the operation of a microcomputer shown in FIG. 1.

A configuration of an embodiment of the present invention will be explained with reference to FIG. 1. In FIG. 1, reference numeral 1 designates a temperature detector for detecting the atmospheric temperature in the freezer compartment, numeral 2 a temperature detector for detecting the atmospheric temperature in the fresh food compartment, and numeral 3 a microcomputer to which the outputs of the temperature detectors 1 and 2 are inputted. Numeral 5 designates a triac for driving a fan 4 for cooling the freezer compartment, numeral 6 a triac for driving the compressor 10 with a frequency from a commercial power supply 11 (hereinafter referred to as "the commercial power frequency"), numeral 7 a rectifier circuit for producing a DC power from the commercial power source 11, numeral 8 an inverter circuit for converting the DC power into an AC power, hereinafter called as inverter-output AC power, having a frequency higher than the commercial power frequency and used for driving the compressor 10 at a higher speed, numeral 9 a switching relay for selectively connecting the compressor to the commercial AC power or the inverter-output AC power, and numeral 12 a drive circuit for driving the triacs 5 and 6, the inverter circuit 8 and the relay 9 in accordance with the outputs of the microcomputer 3.

The microcomputer 3 applies an output thereof to the triacs 5, 6, inverter circuit 8 and the relay 9 in accordance with the inputs from the temperature detectors 1 and 2.

Now, explanation will be made of the operation of the embodiment shown in FIG. 1 with reference to the time charts of FIGS. 2A to 2F. The compressor 10 is driven at normal rotational speed (such as 3000 rpm) by the commercial AC power in section 1, and at a high rotational speed (such as 5000 rpm) by the inverter-output AC power in section 2. As shown in FIGS. 2A and 2B, in the section 1, the atmospheric temperature $T_F$ of the freezer compartment and that $T_R$ of the fresh food compartment are maintained lower than predetermined temperature levels $T_F^o$ (for example $-10°$ C.) and $T_R^o$ (for example 10° C.) respectively and hence the freezer compartment temperature detector 1 and the fresh food compartment temperature detector 2 produce no output signal. Under such a condition, the operation of the compressor is the same as that of the conventional refrigerator. That is, the triac 6 is rendered conductive periodically at predetermined time intervals, as shown in FIG. 2D, while the relay 9 is positioned so as to connect the compressor 10 to the commercial AC power through terminals 9-1' and 9-2', by control of the microcomputer 3 so that the compressor 10 is driven periodically at the predetermined time intervals in the same manner as that of the conventional refrigerator thereby maintaining the temperatures of the freezer compartment and the fresh food compartment below $T_F^o$ and $T_R^o$, for example about $-18°$ C. and $3°$ C., respectively. The triac 5 is also rendered conductive periodically, as shown in FIG. 2C at the same time intervals by control of the microcomputer 3, so that the fan 4 is driven parallely with the compressor 10.

Now, assume that new loading of foods or the like, escape of the cooled air by door operation or the like, cause the atmospheric temperature in the freezer compartment or the fresh food compartment to rise beyond the temperature level $T_F^o$ or $T_R^o$, respectively, as shown in FIGS. 2A and 2B, which is detected by the detector 1 or 2, thereby producing an output signal, which is applied to the microcomputer 3. During a predetermined time length $t_1$ or $t_2$ such as 30 minutes (as assumed in the description that follows) from appearance of the output signal of the detector 1 or 2, the compressor 10 is continuously operated at normal rotational speed by the commercial AC power. If the temperature of the freezing or cooling chamber is still higher than $T_F^o$ or $T_R^o$ after a lapse of the 30-minute period, the microcomputer 3 produces an output signal, by which the triac 6 is turned off as shown in FIG. 2D, and then the switching relay 9 is switched to connect the compressor 10 to the terminals 9-1 and 9-2 on the inverter circuit 8 side as shown in FIG. 2F. Further, the output signal of the microcomputer 3 is applied to the inverter circuit 8 for actuating the same, thereby driving the compressor 10 at high speed by the inverter-output AC power.

Until the temperature in the freezer compartment or the fresh food compartment is reduced below $T_F^o$ or $T_R^o$, the compressor 10 continues the high speed operation. FIG. 3 is a flowchart showing the operation of the microcomputer 3. First, the temperature in the freezer compartment $T_F$ is detected at $P_1$. If $T_F$ is lower than $T_F^o$, an internal time counter for $t_1$ is cleared to "0" at $P_2$, followed by $P_5$ where the temperature $T_R$ in the fresh food compartment is detected. If $T_R$ is lower than $T_R^o$, another internal timer counter for $t_2$ is cleared to "0" at $P_6$, followed by $P_9$ where a control command is produced for making the commercial AC power valid for driving the compressor 10. If $T_F$ is higher than $T_F^o$ at $P_1$, on the other hand, the $t_1$-timer is checked at $P_3$. If the count of $t_1$-timer is less than $t_1$, the $t_1$-timer is set to start or allowed to continue its counting operation at $P_4$, followed by step $P_5$. If the count of $t_1$-timer is detected at $P_3$ to be equal to or larger than $t_1$, the process proceeds to $P_{10}$ where a control command is produced for making the inverter-output AC power valid for driving the compressor. Similarly, if the temperature $T_R$ is not less than $T_R^o$ at $P_5$, the $t_2$-timer is checked at $P_7$. If the count of $t_2$-timer is less than $t_2$, the $t_2$-timer is set to start or allowed to continue its counting operation at $P_8$, followed by $P_9$. If the count of $t_2$-timer is not less than $t_2$, the process proceeds to $P_{10}$. In this manner, only when the atmospheric temperature in the freezer compartment or the fresh food compartment is not reduced below a predetermined level $T_F^o$ or $T_R^o$ for a predetermined length of time $t_1$ or $t_2$, the compressor is driven at the higher speed by the inverter-output AC power, thereby to increase the cooling capacity of the refrigerator, thus preventing the compressor from being driven at the higher speed with a temporary temperature rise in the freezer compartment or fresh food compartment.

It will thus be understood from the foregoing description that according to the present invention, the compressor is driven at normal rotational speed when the atmospheric temperature in any of the freezer compartment and the fresh food compartment is lower than a predetermined level, whereas the compressor is driven at higher rotational speed for rapid cooling when the temperature in the freezer compartment or the fresh food compartment is not reduced below the predetermined level for a predetermined length of time. As a result, the cooling capacity is improved in the case where the rapid cooling is required, thereby contributing to an improved shelf life of foods on the one hand, and avoiding frequent high-speed compressor operations thereby to prevent an increased power consumption and noises on the other hand.

We claim:

1. A temperature control system for a refrigerator having a compressor for compressing a refrigerant, said system comprising:
   means for converting a first AC power level of a first frequency into a second AC power level of a second frequency higher than said first frequency;
   switching means for selectively connecting the compressor to any one of said first AC power level and said second AC power level;
   temperature detector means for detecting an internal temperature of the refrigerator; and control means responsive to the detected internal temperature of the refrigerator to operate said switching means so as to connect said compressor to said first AC power level when said detected internal temperature is above a predetermined temperature level and to connect said compressor to said second AC power level when said detected internal temperature remains above said predetermined temperature level for at least a predetermined time interval.

2. A temperature control system for a refrigerator comprising a first compartment, a second compartment, a compressor for compressing a refrigerant used for cooling said first and second compartments, means for converting a first AC power level of a first frequency into a second AC power level of a second frequency higher than said first frequency and switching means for driving said compressor selectively by any one of said first and second AC power levels, said control system comprising:
   a first temperature detector for detecting a temperature of said first compartment and producing an output signal when the temperature of said first component is not less than a predetermined first level;
   a second temperature detector for detecting a temperature of said second compartment and producing an output signal when the temperature of said second compartment is not less than a predetermined second level;
   means responsive to any of the output signals of said first and second temperature detectors produced continuously for at least a predetermined time interval for operating said swithching means to drive said compressor at said second AC power level.

3. A temperature control system according to claim 2, wherein said compressor is driven at said first AC power level during said predetermined time interval.

* * * * *